United States Patent [19]

VandenBroek et al.

[11] 3,842,422

[45] Oct. 15, 1974

[54] METHOD AND APPARATUS FOR RECORDING SIGNALS

[75] Inventors: Jan A. VandenBroek, Ann Arbor; William L. Wilfong, Whitmore Lake, both of Mich.

[73] Assignee: Transidyne General Corporation, Ann Arbor, Mich.

[22] Filed: Oct. 12, 1973

[21] Appl. No.: 405,918

[52] U.S. Cl. ............... 346/1, 235/151.35, 356/201, 346/13, 346/33 A, 346/49, 346/62
[51] Int. Cl. .............................................. G01d 9/38
[58] Field of Search ........... 346/33 A, 13, 1, 62, 49; 356/203, 202, 201, 98, 96, 39; 235/151.35

[56] References Cited
UNITED STATES PATENTS
| | | | |
|---|---|---|---|
| 3,098,689 | 7/1963 | Caflisch et al. | 346/49 |
| 3,600,567 | 8/1971 | Varnela | 235/151.35 X |
| 3,706,877 | 12/1972 | Clifford et al. | 235/151.35 |

*Primary Examiner*—Joseph W. Hartary
*Attorney, Agent, or Firm*—Fisher, Krass, Young & Gerhardt

[57] ABSTRACT

A system for recording the output of a density scan in a manner which simplifies the computation of the integrals of various fractions of the scan employs a photodetector for scanning the sample in a forward direction and then in the reverse direction. During the forward scan the output of the densitometer is recorded on a chart recorder and is simultaneously applied to an integrator. At the end of the forward scan the integrated signal is stored and applied as an input to adjust the gain of a variable gain circuit. Both the sample scan direction and the recorder direction are then reversed and the time varying output of the integrator is applied to the variable gain circuit and the output of that circuit is recorded producing a second integral trace bearing a one-to-one relationship along vertical lines with the previous density trace. This recorded integral scan is thus normalized as a function of the value of the total integral of the signal so that the integral of any segment of the first trace may be readily determined by observing the change in value of the second trace in the span of that segment.

12 Claims, 6 Drawing Figures

3,842,422

AREA OF THIS FRACTION IS 14.5% OF TOTAL

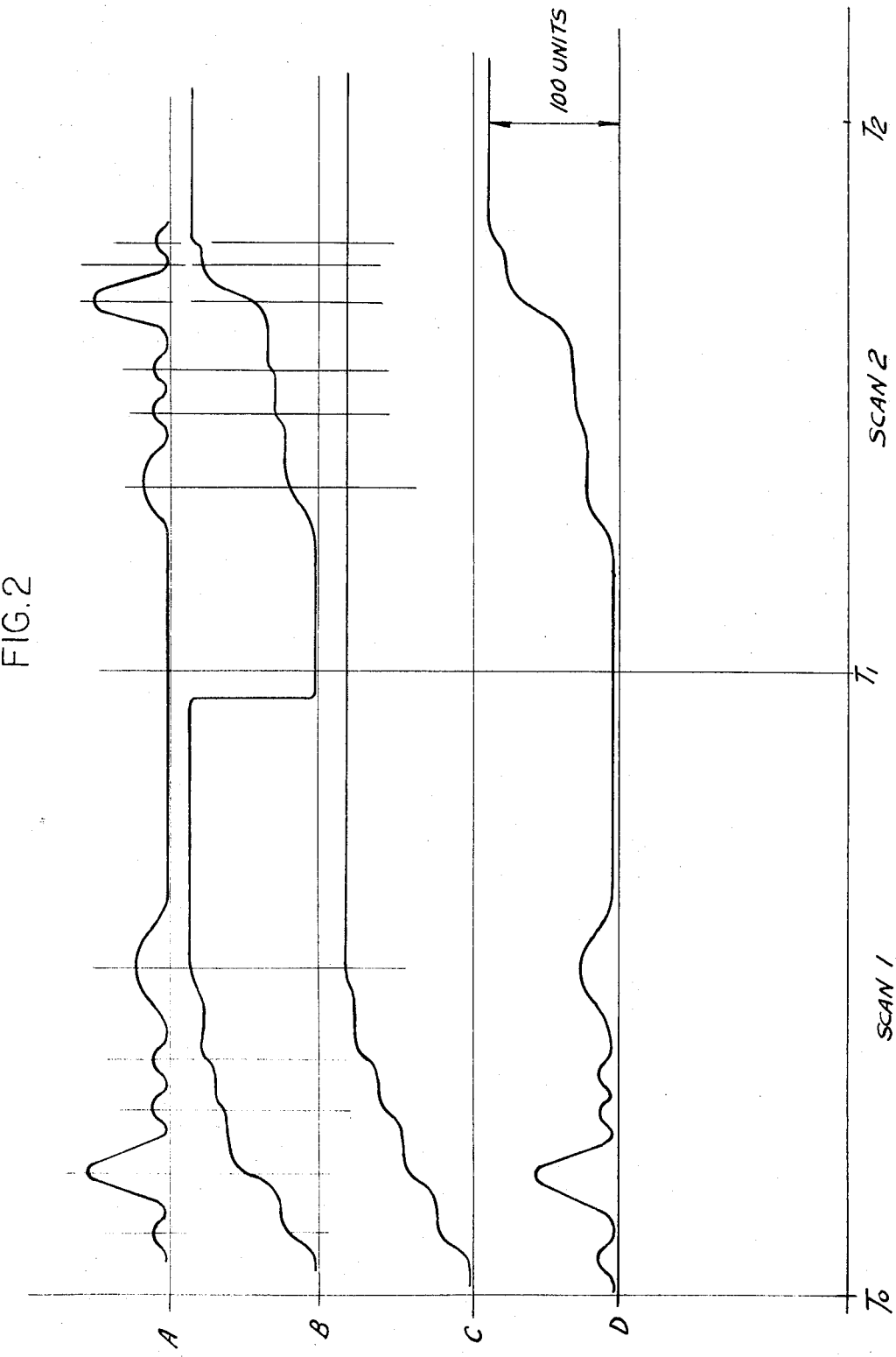

METHOD AND APPARATUS FOR RECORDING SIGNALS

BACKGROUND OF THE INVENTION

1. Field of the Invention

This invention relates to certain apparatus for processing and recording the variable characteristic of a time varying signal in such a manner that the relationship of the integral of any interval of the signal to the integral of the total signal may be readily determined.

2. Prior Art

In a variety of analytic systems it is desirable to determine the relationship that one reading bears to plurality of readings. For example, a chromatograph or spectrometer may scan a sample to provide as an output a signal having a characteristic that varies as a function of the measurement of a component being instantaneously analyzed. These signals are conventionally recorded by a strip recorder or the like for analysis. Such analysis is often directed to the determination of the value that a portion of the recorded output representing one component bears to the total analyzed sample. For example, in analyzing the recorded output of a spectrometer it is desirable to determine the percentage of the total sample that is represented by a fraction of the recorded curve relating to one component of the sample. Similarly, to determine the composition of a blood sample, that sample is often separated by electrophoretic techniques and the separation is then scanned photoelectrically to generate an output signal having a voltage that varies as the function of the density of the component being scanned. To determine the percentage distribution of the various protein constituents in the blood sample, the recorded trace is analyzed to determine what percentage of the integral of the total sample is represented by the integral of that segment of the curve indentifying with each protein under consideration.

Previous to the present invention two alternative techniques were generally used to make such an analysis. Computers were available that would accept the output signal of the scanning device and calculate the total integral of the signal, the integrals of the various fractions, and the percentage that each fraction represented of the total sample. At the other extreme the recorded trace of the time varying output signal of the scanner could be analyzed by graphic techniques to determine the percentages represented by various fractions of the curve. To simplify this graphic computation process it has been previously proposed to integrate the time varying signal as it is generated and record the integral of the signal on the chart or other record media in proper relationship to the record of the time varying value. The total value of the integral may then be measured on the chart and divided by the measured value of the integral changes occurring in the span of a fraction of the curve to determine the percentage of the total measured sample represented by that fraction.

3. Summary of the Invention

The present invention is directed to a method of recording the time varying signal and to apparatus for practicing that method which substantially simplifies the process of graphic analysis of the recorded traces to determine the magnitude represented by a particular segment or fraction of the trace either as a percentage of the magnitude of the entire sample or directly in terms of some measurement such as weight.

This is broadly achieved by recording the trace of the time varying scan output in the conventional manner and also recording the integral of the time varying signal alongside the trace with the integral normalized so that its total value equals some predetermined scale value such as 100 percent, or the total weight of the sample, etc. Assuming the scanned output is recorded in the normal manner with the magnitude of the variable measurable along the Y-axis, or ordinate, and the components of the sample being arrayed along the X-axis, or abscissa; to determine the relative magnitude of any fraction of the sample represented by a scan interval it is only necessary to determine the differential in ordinates between the beginning and end of the portion of the integral trace in that scan interval. Assuming the integral has been normalized so that the full scale value represents 100 percent, if the recorded integral value along the Y-axis changes by, say, the value of 23 in the interval defined by the beginning and end of the fraction of the primary trace along the X-axis, the component of the sample scanned during that interval will represent 23 percent of the total sample. Alternatively, the integral scan may have been normalized so that its total value represents the total weight of the sample. The weights of the individual fractions of the scan will then be directly readable.

This unique and highly advantageous record format may be achieved by generating the scanned output twice: during the first scan the time varying value of the output is recorded and the output signal is also integrated. At the end of the first scan the integral value is stored and used to adjust the setting of a variable gain circuit. The circuit preferably provides an output which is equal to a constant multiplied by its input and divided by this gain factor. The sample is then scanned again and its output is integrated. The output of the integrator is provided to the variable gain circuit and the output of the variable gain circuit is recorded. Preferably the first scan is made in a forward direction and the second scan is made in the reverse direction. The recorder is likewise driven first forward and then reverse so that the trace of the normalized integral of the time varying signal is positioned relative to the first trace of the time varying characteristic itself so that the value of the integral at any point along the time axis represents the integral of the time varying trace to the same point.

Alternatively, both the trace of the time varying characteristic and the trace of the integral of that characteristic may be recorded by a two-pen recorder or double beam oscillograph during the second scan, allowing the first scan to be entirely devoted to generating the total integral.

Since the magnitude of the integral generated during the first scan, and used to control the gain of the variable gain circuit during the second scan, is exactly equal to the magnitude of the total integral signal generated during the second scan, the peak output of the variable gain circuit occurring at the end of the second scan will equal the constant of the variable gain circuit. The value of this constant may be chosen such that the peak output equals 100 divisions on the ordinate of the recorder so that each vertical division may be taken to equal 1% of the total area under the variable curve. Because of the positional correspondence between the position of the recording head along the X-axis and the position of the scanner along the sample during the two traces the integral trace and the density trace will in turn exhibit a correspondence. Therefore, to find the integral for any given section of the scanner output trace it is only necessary to extend vertical lines from the trace section to intersect the integral trace and to then count the number of vertical divisions the integral line traverses during this interval.

Alternatively the constant of the variable gain amplifier may have been adjusted to give a total integral value equal to the weight of the total sample, so that the integral changes associated with any section of the curve are directly representative of the weight of the associated scan fraction.

As described above the system requires a variable gain device having an output which is a linear function of its gain adjustment. A transconductance multiplier operating in a division mode might be used to implement such a variable gain circuit. An alternative embodiment of the invention will be subsequently disclosed which can employ a variable impedance or variable gain element having a nonlinear output as a function of its gain adjustment. Such nonlinear circuits, which are often easier and cheaper to implement than linear circuits, may be utilized by providing the integrated output of the scanner to the variable gain circuit during the first scan and feeding back the output of the variable gain device to its gain adjustment input through a differential amplifier and a sample-and-hold circuit. The differential amplifier is referenced to the desired full scale of the recorder so that at the end of the first scan the sample-and-hold circuit retains the value necessary to generate a full scale output from the variable gain circuit for a full integral value at the input of the circuit.

In another alternative embodiment of the invention a chart recorder is utilized of the type employing an adjustable gain element, such as a potentiometer in its servo drive. During the second scan the integral value of the curve calculated and stored at the end of the first scan is used as the reference value for the servo potentiometer.

Since the integrators, sample-and-hold circuits and variable gain elements employed with apparatus formed in accordance with the present invention are relatively simple and low in cost, the cost of the system of the present invention is comparable to that of conventional recording systems, yet it obviates the necessity of performing laborous graphic computations or using an expensive computer to determine relative fraction values.

Other objectives, advantages and applications of the present invention will be made apparent by the following detailed description of the preferred embodiment of the invention and several variations therein. The description makes reference to the accompanying drawings in which:

FIG. 2 is a graphic representation of wave-forms at selected points in the circuitry of FIG. 1 during the first and second scan of a typical density sample;

Figure 1:
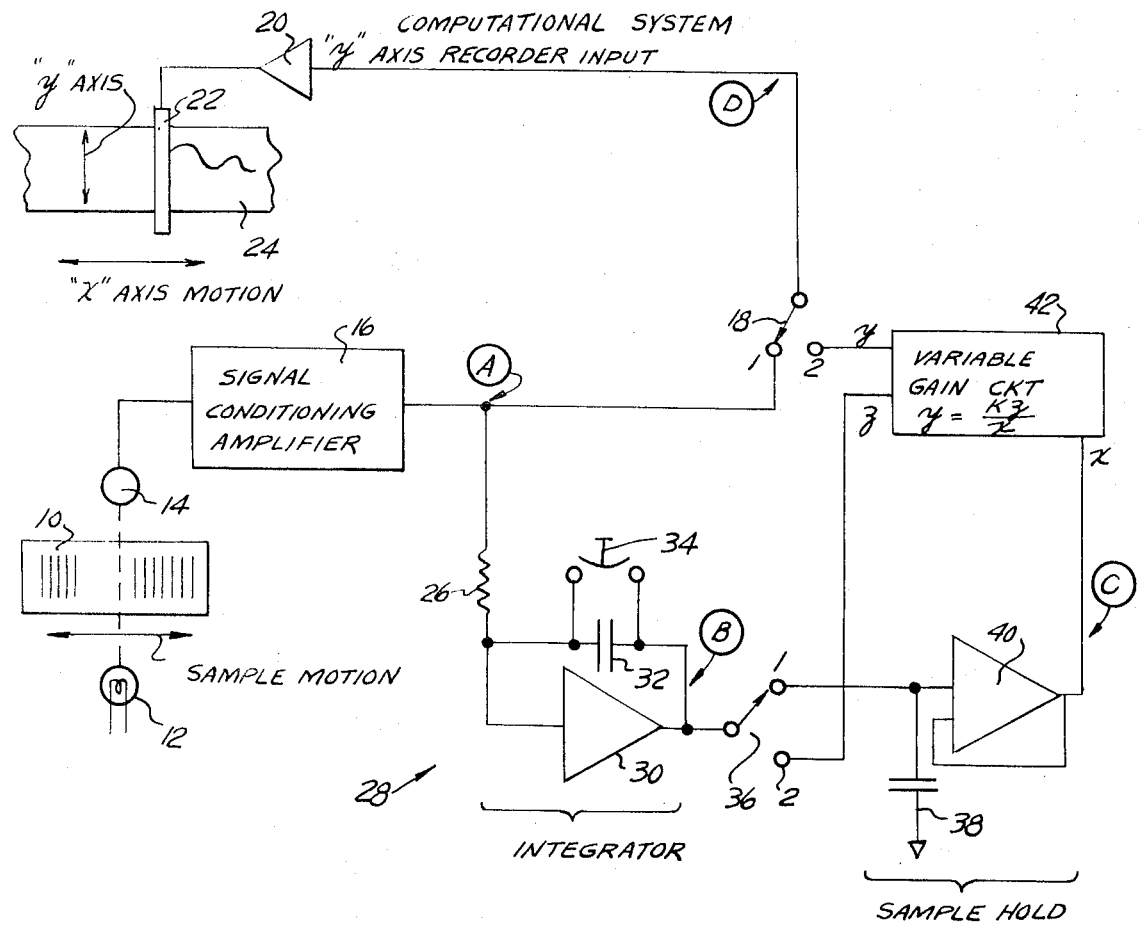
FIG. 1 is a schematic diagram of a system constituting the preferred embodiment of the present invention for receiving the output of a scanning densitometer and recording that output on a chart recorder.
Figure 3:
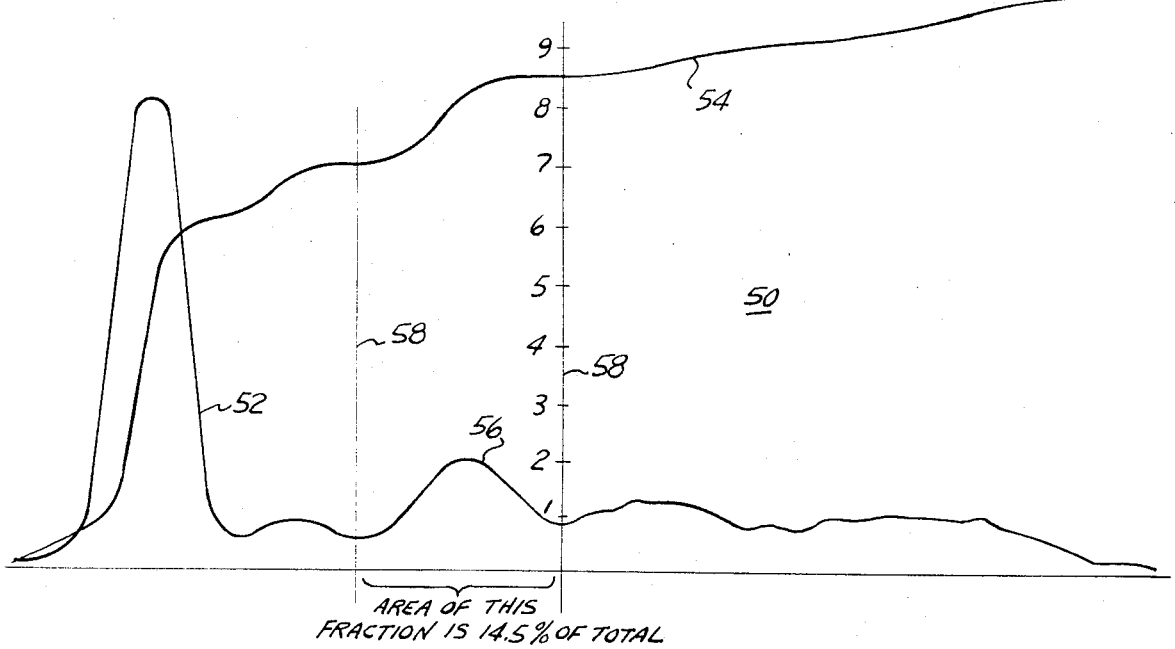
Figures 4, 5:
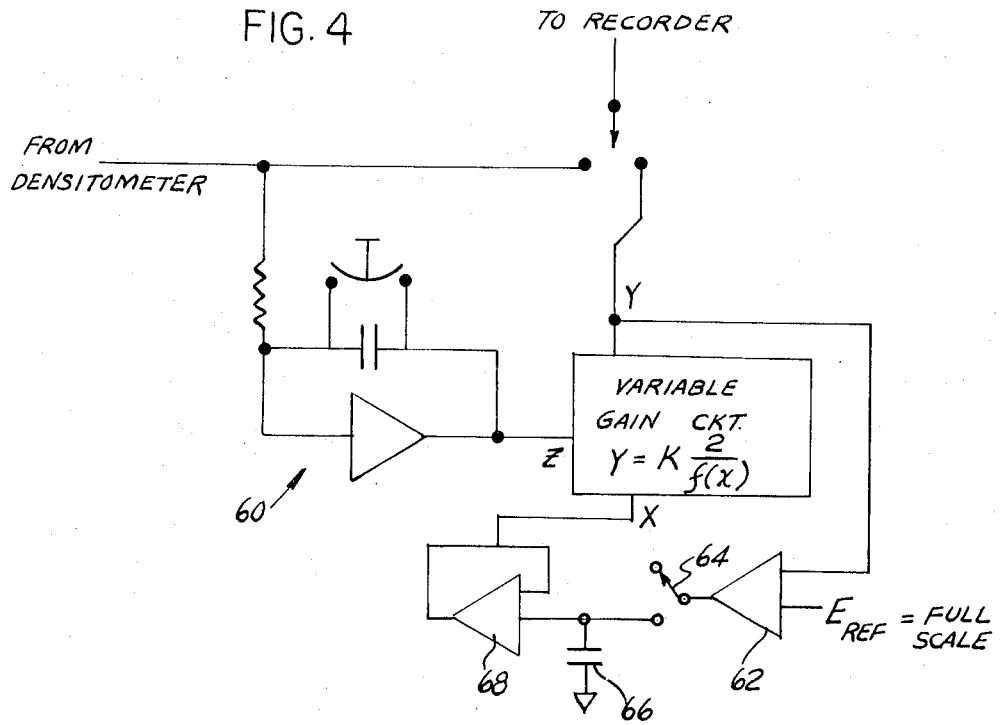
Figure 6:
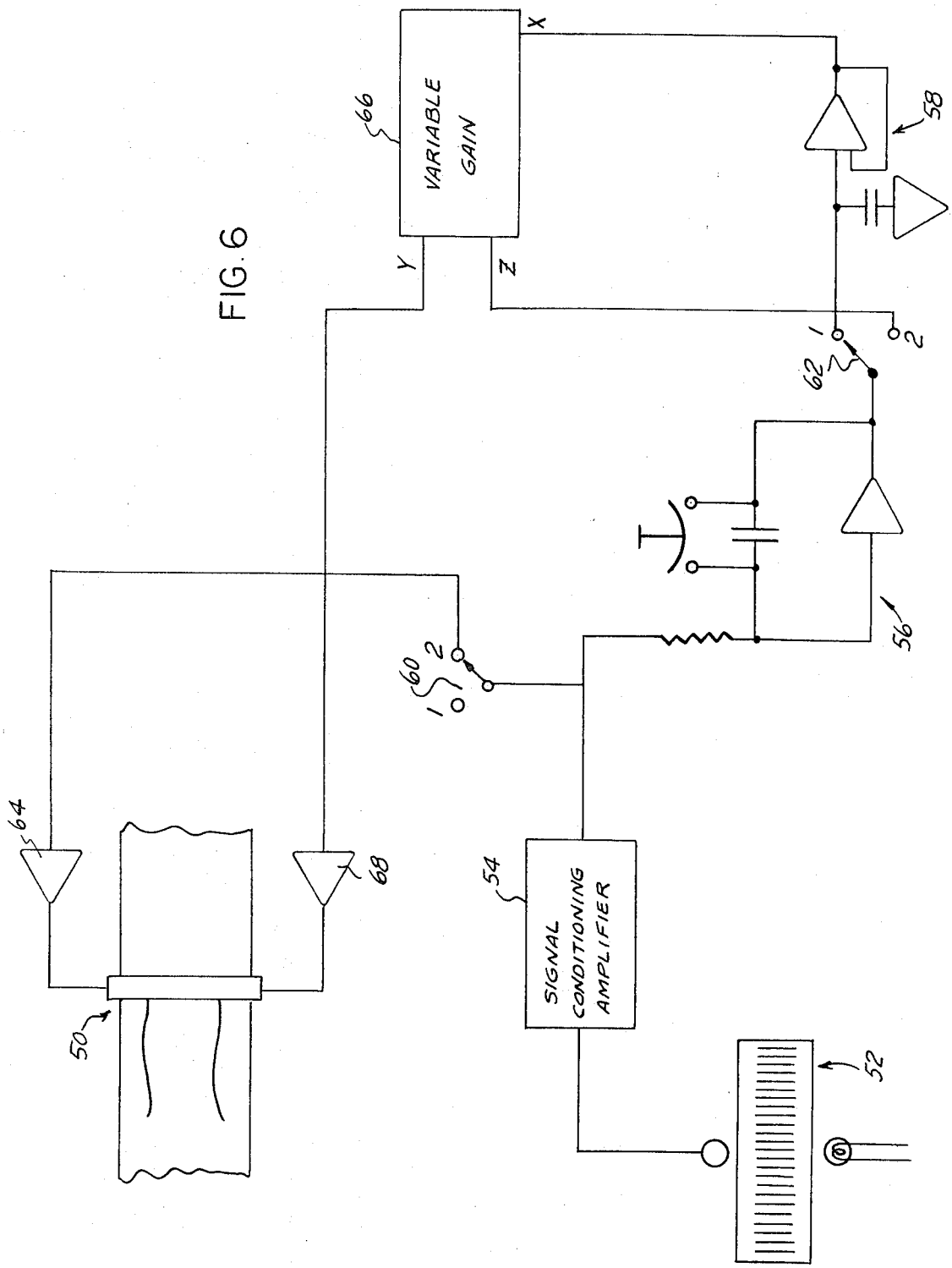

FIG. 3 represents the output of the recorder used with the system of FIG. 1 in the practice of the present invention illustrating both the density trace produced during the first scan of the sample and the normalized integral trace produced during the second scan of the sample, and containing computational lines illustrating the method of determining the percentage of the total sample represented by one fraction of the density trace;

FIG. 4 is a schematic diagram of a variation of the circuitry of FIG. 1 which enable the use of a nonlinear variable gain circuit;

FIG. 5 is a schematic diagram of a second embodiment of the invention wherein the potentiometer in the servo loop of the chart recorder acts as the variable gain element; and FIG. 6 is a schematic diagram of an alternative embodiment of the invention employing a two-channel chart recorder to form traces of both the time varying signal and its integral during a second densitometer pass, the normalizing total integral value having been generated during a first pass.

The preferred embodiment of the invention is directed to recording traces useful in the analysis of the components represented in a density separation, schematically illustrated at 10. This separation may be of the type resulting from placement of a blood sample, supported in a gel or cellulose media, in an electric field. The various protein constituents of the blood migrate in the direction of the field at differing rates depending upon their individual molecular structures. This results in a separation of the various constituents that is typically analyzed to determine the quantity of a constituent in the sample on the basis of the light transmission ability of the resulting segment of the separation. A variety of instruments are commercially available for performing the separation and for measuring the density of the samples.

The densitometer is schematically represented as employing a light source 12 and a photo-detector 14 on opposed sides of the sample 10. The sample may be translated with respect to the light source and photo-detector so that the light reaching the photo-detector is a function of the density of the sample and the point being scanned. The densitometer preferably has the ability to translate a sample relative to the optical apparatus in both a forward and reverse direction.

The output of the photo-detector 14 is passed through a signal conditioning amplifier 16 of conventional type and is then provided to one terminal of a single-pole-double-throw switch 18. The common terminal of the switch is connected to the input amplifier 20 of a chart recorder pen drive mechanism 22. The paper chart 24 may be driven in forward and reverse directions with regard to the pen or other writing mechanism 22. It should be understood that other forms of recording mechanisms such as oscillographs could be used in connection with the present invention. When the switch 18 is positioned to connect the output of the amplifier 16 to the recorder amplifier 20 and a density sample 10 is scanned in the densitometer, a trace is produced on the chart 24 having a departure along the Y-axis which is proportional to the instantaneous output of the amplifier 16, or the density of a point on the sample 10 being scanned.

The output of the signal conditioning amplifier is provided through a resistor 26 to an integrator generally indicated at 28 and consisting of an operational amplifier 30 having an integrating capacitor 32 connected in a feedback manner. A normally open, momentary contact push button switch 34 shunts the capacitor 32 and allows the integrator to be reset to zero. The voltage at the output of the integrator is proportional to the integral of the voltage provided through the resistor 26.

The output of the integrator 28 is connected to the common terminal of a second single-pole-double-throw selector switch 36. In one setting of the switch 36 the integrator output is provided to a sample-and-hold circuit consisting of a storage capacitor 38 and an operational amplifier 40. The voltage from the integrator is applied to the capacitor 38, which has its other terminal grounded and the amplifier 40 acts to retain the charge on the capacitor. When the selector switch 36 connects the integrator to the sample-and-hold circuit that circuit is charged to a voltage corresponding to the integrator setting, and retains it after the integrator is disconnected from the circuit.

The output of the sample-and-hold circuit is connected to the dividing input of a transconductance multiplier schematically illustrated at 42. The other input to this variable gain circuit 42 is derived from the second pole of the selector switch 36. The variable gain circuit 42 acts to multiply this input from the switch 36 by a constant divided by the voltage retained in the sample-and-hold circuit. The output of the variable gain circuit is provided to the second pole of the selector switch 18 which has its common terminal connected to the recorder.

In operation of the circuit of FIG. 1 the voltage on the integrator 28 is initialized to zero by pressing the reset switch 34, the switch 18 is positioned to connect the output of the scanner directly to the recorder and the selector switch 36 is connected to provide the output of the integrator to the sample-and-hold circuit.

The density sample 10 is then scanned in what will be termed a "forward" direction to produce a voltage output on the forward detector 14 which is recorded on the charts 24 as a "density trace" and is also provided to the integrator 28. At the end of the forward scan the integrator has stored a voltage proportional to the time integral of the total trace signal. This voltage is assumed by the capacitor 38 of the sample-and-hold circuit.

At the completion of this first scan the selector switches 18 and 36 are changed so as to connect the integrator to the input of the variable gain circuit 42 and connect the output of that circuit to the recorder. The switch 34 is again pressed to initialize the integrator. The density sample 10 is then scanned in a "reverse" direction, opposite to the direction in which it was first scanned. The chart 24 is also moved in the reverse direction in synchronism with the sample scan. There is thus a one-to-one relationship along the longitudinal axis of the chart 24 between a particular point in the sample and the two points on the chart produced during the first and second scans of the sample; i.e., points of the two traces intersected by a vertical line on the chart are both generated at a particular point in the scan of the sample.

As the scan of the densitometer and the motion of the chart paper undergo their reverse motions the output of the scan is produced by the signal conditioning amplifier 16 is provided to the integrator 28 and the integrator output is provided to the variable gain circuit 42. The output of the variable gain circuit is equal to a constant K multiplied by the input from the integrator and divided by the output of the sample-and-hold circuit. This signal is provided to the recorder and produces a second "integral trace." At the end of that trace the input to the variable gain circuit from the integrator will be equal to the input to the variable gain circuit from the sample-and-hold circuit since the integrals of the output of the scan in both directions are equal. Therefore, at this point the output of the variable gain circuit 42 will be equal to the constant K. This is the maximum value of the integral trace.

The signals at various points in the circuit of FIG. 1 during the first and second traces are illustrated in FIG. 2. During the first trace the voltage at point A in the circuit, the output of the signal conditioning amplifier 16, simply varies as a function of the density of the point of the sample being scanned.

The input to the recorder, and the recorded trace as measured at point D are the same as the signal at point A during the first trace. The output of the integrator 28, at point B, continually rises during the first trace and as this voltage is also provided to the sample-and-hold circuit the output of that circuit at point C follows identically. At the end of the first scan (time $T_1$), the switch 36 is actuated to position 2, and then the switch 34 is actuated to reset the integrator 28 and this voltage again assumes zero value.

During the second or reverse scan the output of the densitometer at point A is the reverse of the output that was generated during the first scan. The output of the integrator at point B has the same final value at the end of the second scan as at the first scan and a signal directly proportional to this integrator output is provided to point D and recorded as the second trace. Throughout the second trace the voltage on the sample-and-hold unit, provided to the gain adjustment input of the variable gain circuit 42, maintains the final value generated by the integrator at the end of the first trace. At the end of the second trace the output of the integrator at point B is again equal to the sample-and-hold value retained during this second trace.

A section of typical chart paper 50 containing a density trace 52 and a normalized integral trace 54 from a representative density sample are illustrated in FIG. 3. The constant K of the variable gain circuit has been adjusted so that the integral of the total sample, as illustrated at the right hand edge of the trace 54 equals 10 large units on the chart paper (or 100 small units). Accordingly, the percentage of the total sample density (and quantity assuming that the protein components are all of equal opacity) of any fraction may be readily determined. For example the peak section 56 of the density trace 52 may be presumed to constitute one protein fraction of the separation represented by the density sample 10. To determine the percentage of that constituent in the total sample vertical lines 58 are drawn from the two ends of the fraction 56 and the extension along the Y-axis of that section of the normalized integral trace 54 intersected by these two lines is determined. In the illustration the integral of that fraction represents 14.5 percent of the total integral.

The constant K of the variable gain amplifier may be made adjustable by conventional circuit means so that it may be set to a value which is representative of the weight of a total sample. Then the weight of any fractional component could be directly determined by the described method.

It should be recognized that as an alternative to scanning the sample twice a single scan may be made and recorded, allowing the signal to be regenerated during playback.

The variable gain circuit 42 of the embodiment of FIG. 1 necessarily has a linear output with respect to its adjustable gain input (the output of the sample-and-hold circuit). Otherwise, the gain cannot be readily adjusted to the value K. FIG. 4 illustrates a variation on the circuitry of FIG. 1 which would allow the use of a nonlinear variable gain circuit. The output of the densitometer is provided to an integrator, generally indicated at 60 and its output is provided directly to the variable gain circuit Z input. The output of the variable gain circuit is summed with a reference voltage that is proportional to the full scale voltage desired by an operational amplifier 62. During the first scan the output of the amplifier 63 is connected by a switch 64 to the integrating capacitor 66 of the sample-and-hold circuit. The operational amplifier 68 at the output of the sample-and-hold circuit provides the variable gain input to the circuit 70. By this circuitry the voltage of the sample-and-hold circuit is adjusted to the necessary voltage to achieve the full scale reference voltage independent of the nonlinearity of the variable gain circuit 70.

This nonlinear variable gain circuit 70 might be implemented with a low cost circuit such as a photodetector controlled by a light emitting diode or pulse with pulse height multiplier.

FIG. 5 illustrates an alternate embodiment of the invention wherein a potentiometer 72 of the type normally associated with a pen drive servo is employed as the variable gain element. The output from the densitometer is provided to an integrator 74 which is connected to the storage capacitor 76 of the sample-and-hold circuit by a selector switch 78. The operational amplifier 80 forming the output of the sample-and-hold circuit is connected to the potentiometer 72 by a selector switch 82 during the second scan and provides the normalizing voltage necessary to adjust the full integral value to 100 percent of the desired ordinate scale.

During the second scan the output of the integrator 74 is provided to a differential amplifier 84 through the switch 78 and another selector switch 86. The other input to the differential amplifier 84 is provided from the variable contact of the potentiometer 72. The output of the amplifier 84 controls a pen drive motor 88 which controls the pen 90 and also the variable contact of the potentiometer 72. During the first scan the switch 82 is connected to a reference voltage which provides the K factor to multiply the density scan.

An alternative embodiment of the invention wherein both the time varying output of the scanner and the integral of that value are simultaneously recorded is illustrated in FIG. 6. The components of the system are much like those of the embodiment of FIG. 1 with the exception of the use of a chart recorder, generally indicated at 50, which has two channels and is capable of recording two traces simultaneously.

The output of the scanner, generally indicated at 52, is passed through a signal conditioning amplifier 54 and to an integrator generally indicated at 56. The sample-and-hold circuit, generally indicated at 58, receives the output of the integrator 56 during the first pass of the scanner 52. During that first pass no signal is provided to the recorder 50. During the second pass a pair of switches 60 and 62 are used to provide the output of the signal conditioning amplifier 54 to one input amplifier 64 of the chart recorder, and to connect the output of the integrator 56 to the variable gain amplifier 66 which has its Y output connected to the other input amplifier 68 of the recorder. During the first pass of the scanner over the sample, the integral of the scanner output, as generated by the circuit 56, is provided to the sample-and-hold circuit 58 but since there is no Z input to the variable gain amplifier 56 that amplifier has no output. During the second pass the output of the integrator 56 is provided at the variable gain circuit, now normalized by the voltage contained in the sample-and-hold circuit 58, and simultaneously the output of the signal conditioning amplifier 54 is provided to the other channel of the recorder as well as to the integrator 56.

Having thus described our invention, we claim:

1. The method of graphically recording a time varying signal comprising: providing said signal to a graphic output device and generating a trace of said time varying signal on said device; providing said time varying signal to an integrator to generate a value proportional to the time integral of said time varying signal; adjusting the gain of a variable gain circuit as a function of the output of said integrator; providing said time varying signal to the integrator and providing the output of the integrator to the variable gain circuit; and recording the output of the variable gain circuit in positional relationship with the trace of said time varying signal.

2. The method of claim 1 wherein said time varying signal is simultaneously provided to said integrator to generate a value proportional to the time integral of said time varying signal and to the graphic output device to generate a trace of said time varying signal.

3. The method of claim 1 wherein said time varying signal is generated by a scanning device, two scans are made by the scanning device, and the output of said scanning device during the first scan is provided to said integrator to generate a value proportional to the time integral of said time varying signal.

4. A system for generating a graphic record of an electrical signal having a time varying characteristic, comprising: means for receiving the signal and generating a signal proportional to the time integral of said characteristic; graphic recording means connected to receive and record the time varying signal; a variable gain circuit; means for adjusting the gain of said circuit to a level controlled by the output of the integrator at the completion of reception of said time varying signal and means for providing said time varying signal to the integrator and simultaneously providing the output of the integrator to said variable gain circuit, and recording the output of the variable gain circuit.

5. The system of claim 4 wherein said means for adjusting the gain of said circuit to a level controlled by the output of the integrator at the completion of reception of said time varying signal by the integrator includes a capacitor and switch means for connecting the capacitor to the output of the integrator at the completion of reception of said time varying signal by the integrator so that the capacitor assumes a charge proportional to the total integral signal, and circuit means connecting the capacitor to the variable gain circuit so that the gain of the circuit is adjusted to a level proportional to the output of the integrator at the completion of reception of said time varying signal by the integrator.

6. The system of claim 4 wherein said electrical signal having a time varying characteristic is generated by scanning a test member and the system includes means for scanning the test member twice and for recording the time integral of the characteristic during the first scan.

7. The system of claim 6 wherein said graphic recording means is connected to receive and record the time varying signal during the first scan.

8. The system of claim 6 wherein said graphic recording means is connected to receive and record the time varying signal during the second scan.

9. The system of claim 4 wherein the variable gain circuit constitutes a portion of a pen drive servomechanism system associated with said graphic recording means.

10. A system for recording a signal having a time varying characteristic in such a manner as to simplify the computation of the integral of any interval of the signal relative to the total integral of the signal comprising: a graphic recorder; an integrator; a variable gain circuit; means for generating said time varying signal; circuit means for applying said signal to said graphic recorder to generate a trace of said time varying characteristic; circuit means for applying said signal to said integrator; means for storing the output of the integral at the end of its reception of said time varying signal; means for adjusting the gain of said variable gain circuit as a function of the output of said storage means; and means for providing said time varying signal to said integrator and the output of the integrator to the variable gain circuit and recording the output of the variable gain circuit on said recording means in positional alignment to the record of the time varying signal.

11. The system of claim 10 wherein said means for generating said time varying signal consists of a scanner for a sample and such system includes switching means for connecting the means for storing the output of the integral to the integrator during a first scan of the sample and for connecting the output of the integrator to the variable gain circuit during a second scan of the sample.

12. The system of claim 10 wherein said means for storing the output of the integral at the end of its reception of said time varying signal constitutes a capacitor.

* * * * *